United States Patent [19]
Manning et al.

[11] Patent Number: 6,088,578
[45] Date of Patent: Jul. 11, 2000

[54] BURST REQUEST METHOD AND APPARATUS FOR CDMA HIGH SPEED DATA

[75] Inventors: Serge Manning, Plano; Kim Chang, Richardson, both of Tex.

[73] Assignee: Nortel Networks Corporation, Montreal, Canada

[21] Appl. No.: 09/218,969

[22] Filed: Dec. 22, 1998

Related U.S. Application Data

[60] Provisional application No. 60/079,512, Mar. 26, 1998.

[51] Int. Cl.⁷ .................................................. H04Q 7/38
[52] U.S. Cl. .............................. 455/68; 455/68; 455/517; 455/466; 455/95; 455/509; 370/337; 370/347; 370/344
[58] Field of Search ............................. 455/68, 509, 510, 455/515, 516, 517, 450, 455, 464, 406, 407, 414, 405, 466, 418, 419; 370/347, 468, 336, 337, 349, 338, 335, 342

[56] References Cited

U.S. PATENT DOCUMENTS

| | | | |
|---|---|---|---|
| 5,109,393 | 4/1992 | Saegusa ................................... | 455/466 |
| 5,502,725 | 3/1996 | Pohjakallio ............................. | 370/337 |
| 5,539,743 | 7/1996 | Amemiya et al. ...................... | 370/468 |
| 5,555,446 | 9/1996 | Jasinski ................................... | 455/510 |
| 5,729,541 | 3/1998 | Hamalainen et al. .................. | 370/337 |
| 5,749,053 | 5/1998 | Kusaki et al. ........................... | 455/517 |
| 5,774,057 | 7/1998 | Klbermatter ............................. | 455/68 |
| 5,805,997 | 9/1998 | Farris ...................................... | 455/466 |
| 5,878,036 | 3/1999 | Spartz et al. ............................. | 455/466 |
| 5,878,397 | 3/1999 | Stille et al. .............................. | 455/466 |
| 5,931,964 | 8/1999 | Beming et al. .......................... | 370/468 |
| 5,940,770 | 8/1999 | Kuki ........................................ | 455/510 |

*Primary Examiner*—Fan Tsang
*Assistant Examiner*—Simon Nguyen
*Attorney, Agent, or Firm*—Carr & Storm, L.L.P.

[57] ABSTRACT

Disclosed is an apparatus and method for increasing the efficiency of usage of an assigned rf spectrum used by a cellular or wireless communication system for a large number of high speed data transfer user requests. An MS, upon analyzing a plurality of parameters available to the MS may determine that although it needs more than a single channel to accommodate a given software data generating application, it may adequately and optimally use less than the maximum number of channels (or maximum data rate) that the MS can support. The MS then generates a request to the base station for additional channels (or a supplemental channel of a higher data rate) to transmit in one data burst a specified total number of quantity of data. The request may also specify the maximum number of channels (or maximum data rate) that the MS can support along with an indication of relative priority by means of indicating the amount of time over which the burst occur as an optimum situation for the MS. The response from the base station may downwardly adjust the number of channels (or data rate) from that considered optimal in the request by a mobile station for a high speed data burst when available system resources are inadequate to accommodate all requests.

10 Claims, 3 Drawing Sheets

| NUMBER OF CHANNELS | DURATION | TIME OF BURST | |
|---|---|---|---|
| 6 | 11 | 0.88 SEC | } MS DOES NOT NEED THIS |
| 5 | 13 | 1.04 SEC | } QUANTITY OF RESOURCE |
| 4 (PREFERRED) | 16 | 1.28 SEC | } |
| 3 | 21 | 1.68 SEC | } BS CHOOSES ONE OF THESE |
| 2 | 32 | 2.56 SEC | } |

BURST REQUEST METHOD AND APPARATUS FOR CDMA HIGH SPEED DATA

This Application is a continuation in part of and claims the benefit of U.S. Provisional Application No. 60/079,512, filed Mar. 26, 1998.

TECHNICAL FIELD

The present invention relates in general to high speed data (HSD) cellular or wireless communication systems and in particular to methods and systems for dynamically allocating available system resources assigned to an MS for a given data burst. This may take the form of number of channels assigned or data rate of one or more supplemental channels.

BACKGROUND

The rate at which a mobile station (MS), in a wireless communication system, needs to send data to a base station (BS) may change in accordance with many variables. Telemetry and metering applications would typically have a slower data bit transfer rate than would the sending of a large file. The transfer of an electronic mail (Email) message would not necessarily have a slower data bit transfer rate, but would typically not be as time sensitive as other user interactive transmissions. In instances where the data being transferred comprises words being typed into a word processing or other keyboard entry software program, the data transfer rate would typically be very slow.

Some systems such as Code Division Multiple Access (CDMA) systems utilize MSs that incorporate storage buffers for packet data service. The nature of the traffic is such that periods of relatively short data transmission may be followed by long periods of no data transmission. With such a bursty traffic pattern, the MS will request permission from a BS to transmit data, contained in the buffer at that time, in accordance with various parameters. After completing the data transfer, the MS will release the use of all channels until such time that it needs to send data again. Standards applicable to such systems were generated by the US Telecommunications Industries Association and Electronics Industries Association (TIA/EIA). Specifically the standards IS-95 and IS-707 describe capabilities for a packet data service.

Recently it has been proposed that CDMA systems be designed such that an MS be able to transmit digital data at high speeds over a plurality of channels in a data burst to lessen the time required to empty the buffers of the MS. Consideration is also presently being given providing one or more higher data rate supplemental channels, upon request, to an MS for HSD bursts. For instances of high speed digital data transfer, the most important parameter is likely to be that the buffer is filled to more than a given amount of the total buffer capacity. Standards for such systems have been set forth in standards documents EIA/TIA-95-B and IS-707-A which, at the time of preparing this patent application, is still undergoing approval finalization for wireless system manufacturers and users. Each of these standards are incorporated herein by reference.

SUMMARY OF THE INVENTION

The present invention provides a mechanism for a plurality of mobile stations to communicate high speed data requests during packet data service which include a preference for channel resources to the base station. This allows the base station to manage and balance its resources more effectively by taking into account the preference of each mobile station before assigning it channel resources.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
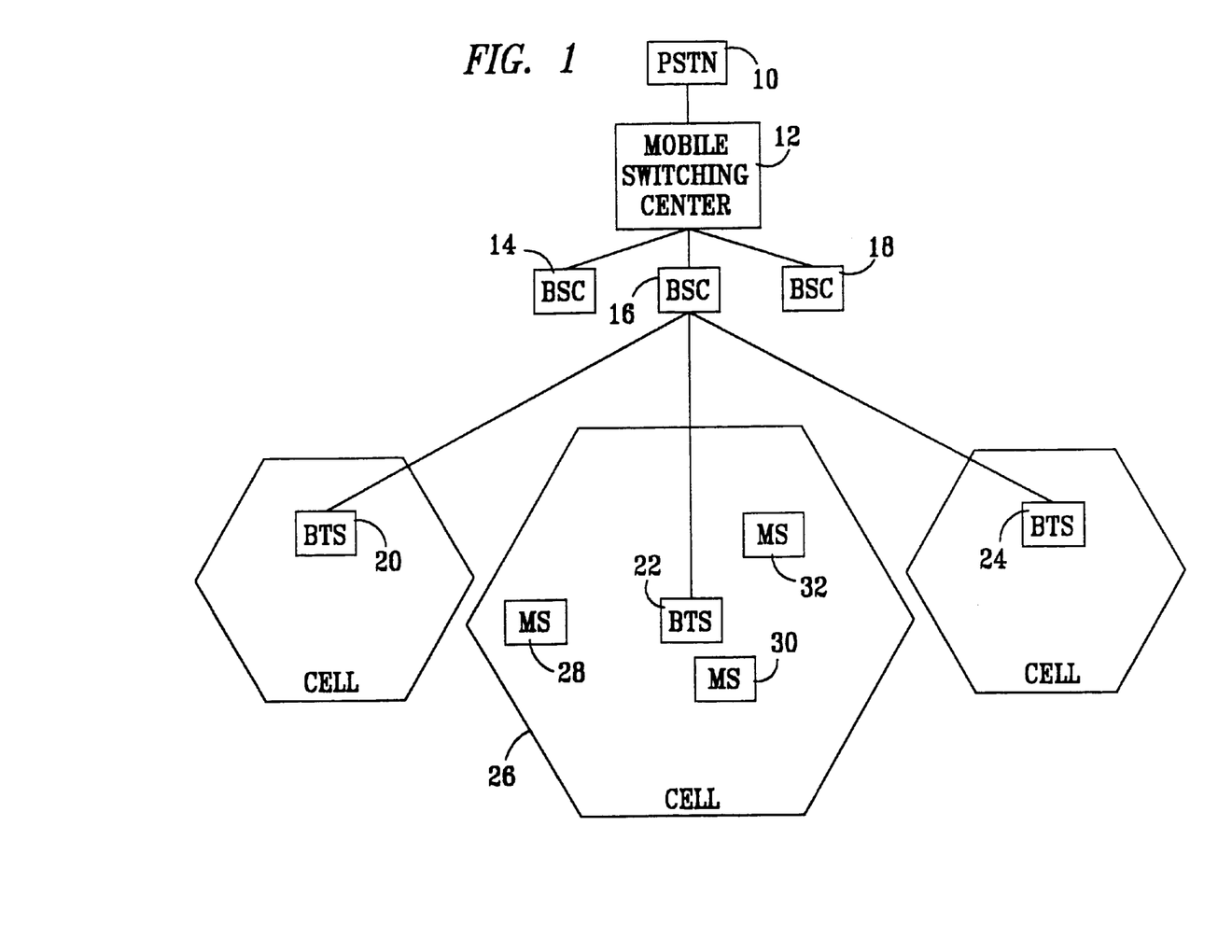
FIG. 1 is a generalized block diagram of wireless cellular system connected to the public telephone system.

In FIG. 1 a block 10 is labeled PSTN and represents the well known Public Switched Telephone Network. Block 10 communicates with a wireless cellular system Mobile Switching Center (MSC) 12. The MSC 12 is shown interconnected with three Base Station Controllers (BSCs) 14, 16 and 18. To simplify the drawing, only BSC 16 is shown connected to further equipment. As shown, BSC 16 is connected to Base Transceiver Stations (BTS) 20, 22 and 24. While 3 items have been shown for convenience in the instance of the BSC and the BTS, it will be realized that an actual system may readily be designed to support more than 3 such subcomponents. Each of the BTSs includes a radio antenna (not shown) which generates radio waves of a given strength such that it may reliably communicate with mobile stations (MSs) situated within a given distance. This area of communication is commonly designated or called a cell. Such cells are shown in this figure and a cell for BTS 22 is designated as 26. Although not shown as such in the drawing, adjacent cells normally overlap such that an MS may be moved from across boundaries from one cell to another cell without interruption of communication between an MS and another connected party.

Within cell 26 there are shown three MS stations 28, 30 and 32. MS 28 is shown near the edge of the cell 26 and would thus have to transmit at maximum power in order to reliably communicate with BTS 22. MS 30 is illustrated as being physically close to the BTS and thus can reliably communicate with BTS 22 at a much lower power level than can MS 28. MS 32 is shown physically located at an intermediate distance from the BTS 22. The standards adopted by the industry limit the total power transmitted at a given moment by an MS in the HSD mode. It should thus be apparent that, under most environmental conditions, MS 28 would be limited to the same number or a lesser number of channels used in a HSD burst than would MS 30 or 32 by the standards and/or the design of the MS. It should be noted that while we refer to the user equipment as being mobile stations, we are merely referring to wireless equipment that uses signals transmitted through the air or other environment as opposed to land based wires. Thus the user equipment may be bolted to the floor of a house and still be part of what we are referring to as a MS.

Figure 5:
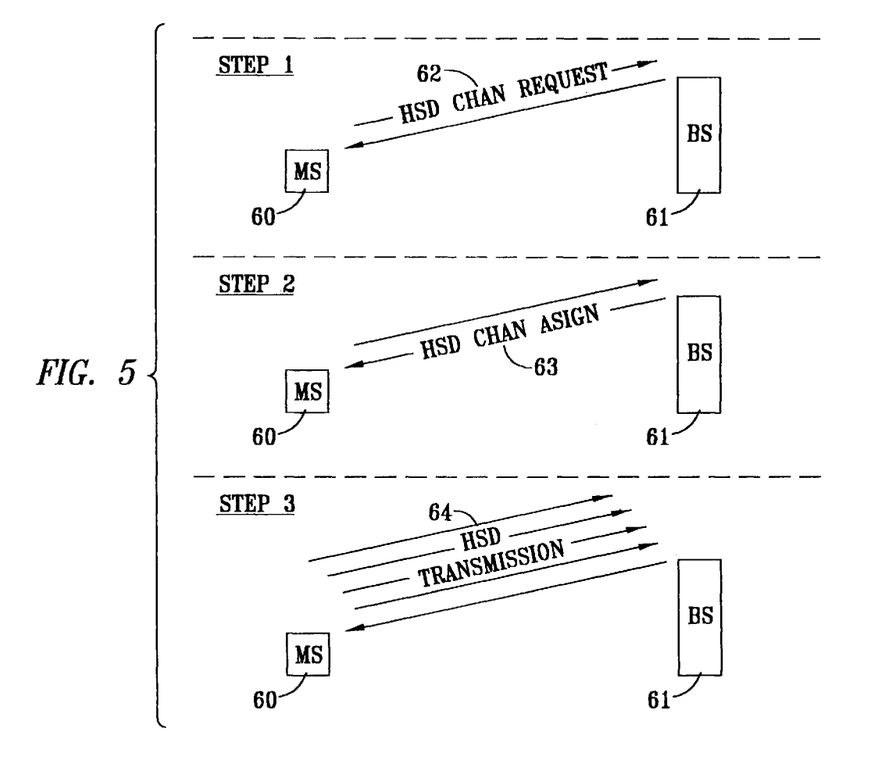
FIG. 5 illustrates three steps involved implementing a HSD burst.

Typically, an MS operates on a single (fundamental) channel and only requests additional (supplemental) channels for a data burst when its buffer is filling faster than can be transmitted on a single channel. The MS transmits in HSD mode by requesting a data burst to the BS and receiving a HSD channel assignment from the BS. FIG. 5 shows the three steps that take place. Initially, an MS 60 is communicating with a BS 61 using non-HSD channels. At the time that MS 60 wishes to transmit a HSD burst, it sends a HSD channel request 62 to the BS 61 as shown in Step 1. If the BS 61 decides to allow the transmission, the BS sends a HSD channel assignment 63 to MS as shown in Step 2. In accordance with parameters included in a HSD channel assignment 63, the MS 60 starts to transmit using HSD channels 64 as shown in Step 3.

Under the initially proposed system for HSD burst transmissions, an MS would request of the BS that the MS be allowed to transmit a burst of data using parameters in the request that were not specified by the MS. If total traffic in that cell was low enough to permit a given MS to use additional traffic channels for a HSD burst, a response from the BS would inform the MS which channels could be used and for how long the channels could be used in addition to the channel presently assigned to that MS. If there was too much traffic in the cell (e.g., too many MSs requesting a HSD burst at substantially the same time), some requests would be denied or reduced arbitrarily by the BS.

Figure 2:
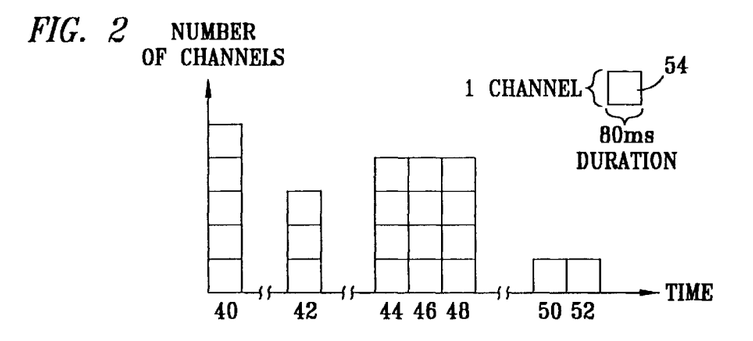
FIG. 2 illustrates, in a pictorial form, several HSD transmissions at different times by a given MS.

In accordance with the present invention, FIG. 2 presents a graph with a vertical axis representing number of channels used by an MS for a given data burst and a horizontal axis representing time of transmission for that data burst. A first data burst designated as 40 utilizes 5 channels and is completed in one time segment. A second data burst, designated as 42, at an undetermined later time uses 3 channels and also is completed in one time segment. A third data burst, uses 4 channels and is completed over 3 contiguous time segments designated as 44, 46 and 48. A final data burst, occupying only a single channel, is shown being completed during time segments 50 and 52. In the upper right portion of FIG. 2 a block 54 is shown being representative of a given block of data and being completed in a standardized unit of time or duration. In one embodiment of the invention the time unit was 80 ms (milliseconds) which provided for the transfer of 128 octets of data. An octet of data is typically considered the equivalent of one byte of data in the telecommunications art. The explanation of operation will use these figures by way of example and not of limitation of invention. Also, for explanatory purposes, it will be assumed that the MS is in synchronism with the BS and no overhead bytes for setup are required in conjunction with the data burst.

Referring again to FIG. 2 it will be apparent that in the data burst of time 40 the maximum number of bytes transmitted will be 128 times the 5 channels used. Thus no more than 640 bytes would be transmitted. If 512 or less bytes needed to be transmitted, no more than 4 channels would have been required. The next data burst is assumed to be between 256 and 384 bytes. The data burst occurring over time periods 44, 46 and 48 provides for the transmittal of approximately 1536 bytes of data using 4 channels over the duration of three time periods. The final example shown provides data sent over a single channel covering two periods 50 and 52 for a total of no more than 256 bytes.

Figure 3:
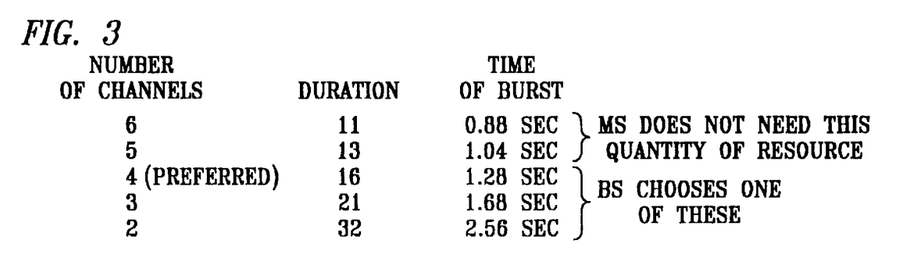
FIG. 3 is a table used in the process of explaining the logic used to select the number of channels assigned to an MS for a HSD burst.

The table of FIG. 3 shows the maximum number of channels that a given MS might be capable of supporting such as 6. For this table it is assumed that the MS has 8000 bytes to send. Using the above assumptions of FIG. 2, this would require 62.5 blocks. Since only a whole number of blocks of data may be transmitted, some number of blocks between 63 and 66 would satisfy all possibilities between 1 and 6 channels. As shown in the table, with two channels, the data burst may be accomplished in 2.56 seconds in 64 blocks of data. With three channels, the data burst may be accomplished in 1.68 seconds using 63 blocks of data. With four channels, the data burst may be accomplished in 1.28 seconds again using 64 blocks of data. If six channels were used, the data burst duration would only be reduced to 0.88 seconds and would use 66 blocks of data.

Using parameters such as will be discussed in connection with FIG. 4, a logic module or other device in conjunction with a burst request module or similar apparatus within an MS may determine that it would prefer to use 4 channels to transmit a data burst in 1.28 seconds. In accordance with this invention, a request would be sent to the BS for the use of supplemental channels in addition to the one presently being used. This request, in one embodiment of the invention, would inform the BS the total number of bytes to be transmitted in the burst (8000), the maximum number of channels that the MS is capable of supporting (6) and a preferred duration (16 time units). Upon receiving the request, a logic chip, resource allocation module or other similar circuitry in the BS (or higher level circuitry in the system) will apportion the resources available for granting the request and return a message to the MS indicating which channels, if any, the MS is permitted to use for the HSD burst. The key item to remember here is that the BS will allocate a number of channels equal to or fewer than preferred. If the preferred duration is much longer than the possible duration (given the current maximum number of channels) then the BS is more likely to give even fewer channels (since logic would dictate that the MS is not in a hurry). If the preferred duration is close to the minimum duration (given the current maximum number of channels) then the BS will try harder to give the required number of channels. Although this invention does not preclude the BS from assigning more channels than preferred (shorter duration than preferred), Such action would be seldom likely to occur. When the MS states a preferred duration, it is effectively saying, "you can assign me a shorter duration but don't bother because I don't need it". Normally the response would assign a number of channels equal to or less than required to achieve the preferred duration. However, special circumstances known, to the BS, may cause the granting of greater than the number of channels indicated by the request. If the BS does not have enough resources (channels) to grant the request for additional channels, a denial may be sent or the request may be ignored. In either case, the MS may be prevented from operating at full capacity until its buffer is emptied by a given amount. An alternative embodiment of this invention would allow the BS to grant the request for additional channels at some near future specific time at which time the BS is assured that there will be adequate resources available.

Figure 6:
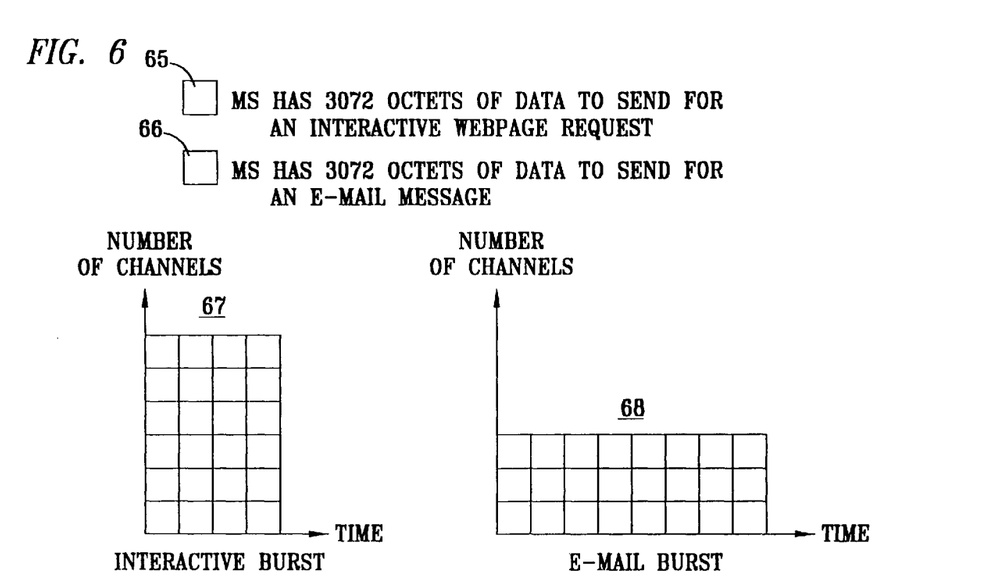
FIG. 6 provides illustrations used in further explaining the logic used to select the number of channels assigned to an MS for a HSD burst.

In accordance with the present invention, FIG. 6 illustrates a situation where two MSs 65 and 66 have the same amount of data, 3072 octets, in their transmit buffers requiring 24 blocks to transmit all the data. Both MSs 65 and 66 are capable of transmitting a maximum of 6 channels of HSD at the present time. However, each MS is running different user application software. MS 65 needs to transmit an interactive webpage request while MS 66 needs to transmit an e-mail message. In this embodiment, MS 65 would benefit from a minimal delay in transmitting the data whereas delay is less important to MS 66. MS 65 constructs a HSD channel request with a preferred duration equal to 4. This would require a burst with 6 channels (its present maximum) which is shown graphically as 67. MS 66 constructs a HSD channel request with a preferred duration equal to 8. This would require a burst with 3 channels (below its present maximum) which is shown graphically as 68.

In this embodiment of the present invention, the appropriate BS (not shown in this figure) receives these two requests and determines that MS 65 prefers the burst be 4 time units long whereas MS 66 does not mind if the burst lasts as long as 8 time units (although it is capable of transmitting the burst more quickly). This information allows the BS to avoid scheduling more than 3 channels to MS 66 and instead allows the BS to assign all available channels to MS 65 (up to a maximum of 6 channels). If insufficient resources are available to satisfy both requests, the BS is likely to assign as many channels as possible to MS 65 and assign less channels than requested to MS 66.

Figure 4:
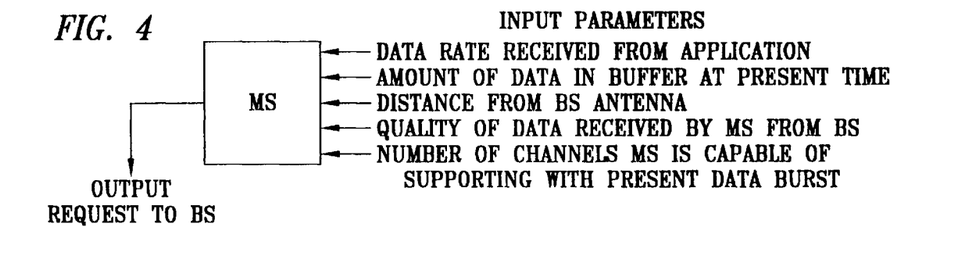
FIG. 4 graphically illustrates some of the parameters utilized by an MS in generating its data burst request.

The diagram of FIG. 4 sets forth some of the parameters that the MS may use in logically determining the amount of data to be transmitted in a HSD burst and what duration to request as a preference. As listed this includes the rate at which data is being received by the MS transmit data buffer, the amount of data in the buffer at the time the request is made, the apparent distance from the BS antenna with respect to the quality of the signal received by the MS from the BS and the number of channels the MS is capable of supporting for the presently requested data burst. Other factors, such as power output limitations of the MS and even possibly user input may also be factored into the logic used to formulate a HSD burst request.

The base station, upon receiving the HSD burst request would check the total available RF resources to the MS in the system. It would take into consideration additional HSD requests by other MSs in the system. If the total number of additional channels requested by MSs for HSD bursts exceeds the available resources, some apportionment algorithm will have to be used by the BS to increase the duration beyond that stated as preferred in at least some of the response messages sent to the MSs. This algorithm needs to be based on considerations to maximize the use of total available resources.

It will thus be apparent, from the above, that this invention allows a wireless communication or cellular system infrastructure, comprising one or more MSs and an associated BS, to cooperatively and adaptively structure the duration of a data burst and accordingly the number of channels assigned to an MS for a given data burst in accordance with system and MS resources available. The factors or parameters used by an individual system and/or its associated MS units in formulating a HSD burst request or system response is a function of performance versus cost and would be individual to a given manufacturer. Thus this invention is not restricted to the parameters utilized in the decision making process even though parameters that may be considered have been set forth as examples in the explanation of operation of the invention. It should be further noted that the MS requests and BS responses may be transmitted on either the traffic or control channels in accordance with system design parameters. Those skilled in the art can readily see that there are different possible permutations of the parameters specified in the request message. The parameters of the burst request must contain the current maximum number of channels and any two of the three parameters: 1) total data, 2) duration, and 3) number of channels to be assigned, wherein one of these latter two parameters needs to be indicated as preferred.

If the new approach to allowing a HSD burst is adopted, the parameters of the burst request, to be used in such a system, would need to indicate the maximum data rate that the MS could support and any two of the three parameters: 1) total data, 2) duration, and 3) data rate, wherein one of these latter two parameters needs to be indicated as preferred.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. A method of processing a burst request signal in a wireless communication system having a mobile station capable of transmitting over a plurality of channels in a data burst and a base station, comprising the step of the mobile station generating the burst request signal, the burst request signal having a plurality of parameters including user data amount, maximum number of said channels on which the mobile station can transmit the burst, and a preferred duration of user data transmission.

2. The method as specified in claim 1 further comprising the step of the base station responding to the burst request signal by generating a resource assignment signal indicating an allocated number of said channels and an assigned duration of user data transmission for the mobile station.

3. The method as specified in claim 2 further comprising the step of the mobile station responding to the resource assignment signal by transmitting the user data according to the allocated number of said channels and the assigned duration of user data transmissions determined by the base station.

4. A base station for use in a wireless communication system having a mobile station capable of transmitting over a plurality of channels in a data burst, the base station comprising:
   a resource allocation module generating a resource assignment signal in response to a burst request signal received from the mobile station, wherein the request signal includes a preferred parameters indicating relative urgency for the request to be granted, the resource assignment signal indicating an allocated number of said channels on which the mobile station is permitted to transmit the data burst and an assigned duration of user data transmission for the mobile station.

5. A mobile station capable of transmitting over a plurality of channels in a data burst for use in a wireless communication system having a base station, the mobile station comprising:
   a burst request module generating a burst request signal having a plurality of parameters including user data amount, maximum number of said channels on which the mobile station can transmit the burst, and a preferred duration of user data transmission.

6. A system for allowing a mobile station (MS) of a wireless communication system to adaptively transmit a high speed data (HSD) burst in accordance with predefined parameters, the system comprising:
   at least one MS capable of transmitting over a plurality of channels in a data burst in communication with a base station (BS);

first logic means, in said MS, for requesting permission from the BS to send a HSD burst wherein the request includes a plurality of parameters including at least the amount of data to be sent in the HSD burst and the maximum number of said channels on which the MS can transmit the HSD burst, one of the parameters being provided supplying an indication of relative urgency of the request;

second logic means, comprising a part of the wireless communication system, for comparing total system resources and the resources required to fulfill all presently unanswered MS HSD requests, and supplying supplemental channel assignment responses to the MS requests where the supplemental channel resources assigned to some of the requesting MSs may be different from that considered to be optimum by said requesting MS.

7. A base station for use in a wireless communication system having a mobile station (MS) capable of transmitting over a plurality of channels in a data burst and desiring the use of at least one supplemental channel of said channels for a high speed data (HSD) burst, the base station comprising:

a resource allocation module generating a resource assignment message in response to a burst request received from the MS, the resource assignment message indicating an allocated number of said channels to be used for the duration of a requested HSD burst transmission from the MS.

8. A mobile station capable of transmitting over a plurality of channels in a data burst for use in a wireless communication system having a base station, the mobile station comprising:

a burst request module generating a high speed data (HSD) burst request having a plurality of parameters including,
  a) maximum number of said channels on which the mobile station can transmit the HSP burst, and
  b) one combination only of A, B, C and D below:
    A) total data to be transmitted in the request burst and preferred duration of user data transmission in the requested burst, or
    B) total data to be transmitted in the request burst and preferred number of channels assigned, or
    C) duration of user data transmission in the requested burst and preferred number of channels assigned, or
    D) preferred duration of user data transmission in the requested burst and number of channels assigned.

9. A method of processing a burst request signal in a wireless communication system having a mobile station capable of transmitting over a plurality of channels in a data burst and a base station, the method comprising the step of the mobile station generating the burst request signal, the burst request signal having a plurality of parameters including user data amount, maximum data rate supported by the mobile station, and a preferred duration of user data transmission.

10. A mobile station capable of transmitting over a plurality of channels in a data burst for use in a wireless communication system having a base station, the mobile station comprising:

a burst request module generating a high speed data (HSD) burst request having a plurality of parameters including,
  a) maximum data transmission rate supported by the mobile station, and
  b) one combination only of A, B, C and D below:
    A) total data to be transmitted in the request burst and preferred duration of user data transmission in the requested burst, or
    B) total data to be transmitted in the request burst and preferred data rate of transmission assigned, or
    C) duration of user data transmission in the requested burst and preferred data rate of transmission assigned, or
    D) preferred duration of user data transmission in the requested burst and data rate of transmission assigned.

* * * * *

UNITED STATES PATENT AND TRADEMARK OFFICE
CERTIFICATE OF CORRECTION

PATENT NO. : 6,088,578
DATED : July 11, 2000
INVENTOR(S) : Manning et al.

It is certified that error appears in the above-identified patent and that said Letters Patent is hereby corrected as shown below:

Column 7, line 37        Delete "HSP" and insert --HSD--

Column 8, line 2        After "of", insert --said--

Column 8, line 4        After "of", insert --said--

Column 8, line 7        After "of", insert --said--

Column 8, lines 15-17        Delete ", maximum data rate supported by the mobile station, and a preferred duration of user data transmission"
and
Insert --and maximum number of said channels on which the mobile station can transmit--

Signed and Sealed this

Seventeenth Day of April, 2001

Attest:

NICHOLAS P. GODICI

Attesting Officer        Acting Director of the United States Patent and Trademark Office

US006088578C1

(12) EX PARTE REEXAMINATION CERTIFICATE (5120th)
United States Patent
Manning et al.

(10) Number: US 6,088,578 C1
(45) Certificate Issued: Jun. 7, 2005

(54) BURST REQUEST METHOD AND APPARATUS FOR CDMA HIGH SPEED DATA

(75) Inventors: Serge Manning, Plano, TX (US); Kim Chang, Richardson, TX (US)

(73) Assignee: Nortel Networks Limited, Brampton (CA)

Reexamination Request:
No. 90/006,576, Mar. 25, 2003

Reexamination Certificate for:
Patent No.: 6,088,578
Issued: Jul. 11, 2000
Appl. No.: 09/218,969
Filed: Dec. 22, 1998

Certificate of Correction issued Apr. 17, 2001.

Related U.S. Application Data

(60) Provisional application No. 60/079,512, filed on Mar. 26, 1998.

(51) Int. Cl.$^7$ .................................................. H04Q 7/38
(52) U.S. Cl. .................... 455/68; 455/517; 455/466; 455/95; 455/509; 370/337; 370/347; 370/344
(58) Field of Search ................................ 455/68, 435.3; 370/322, 335, 336, 468

(56) References Cited

U.S. PATENT DOCUMENTS

| | | | | | |
|---|---|---|---|---|---|
| 4,256,925 | A | * | 3/1981 | Goode | 370/322 |
| 5,442,625 | A | * | 8/1995 | Gitlin et al. | 370/342 |
| 5,557,612 | A | * | 9/1996 | Bingham | 370/449 |
| 5,603,081 | A | * | 2/1997 | Raith et al. | 455/435.3 |
| 5,734,646 | A | * | 3/1998 | I et al. | 370/335 |
| 6,262,980 | B1 | * | 7/2001 | Leung et al. | 370/336 |
| 6,418,148 | B1 | * | 7/2002 | Kumar et al. | 370/468 |

FOREIGN PATENT DOCUMENTS

EP 0767548 A2 * 4/1997

EP 0767548 * 4/1997

OTHER PUBLICATIONS

Lucent Technologies and Qualcomm, Incorporated, "High Data Rate Phase 1–IS–95–B Changes", Jun. 16, 1997.*
Ejzak, et al ,"BALI: A Solution for High–Speed CDMA Data," Bell labs Technical Journal, Jun. 1997.*
Chih–Lin & Nanda, "Load and Interference Based Demand Assignment (LIDA) for Intrgrated Services in CDMA Wireless Systems," IEEE, May 1996.*
Knisely, et al, "Evolution of Wireless Data Services: IS–95 to CDMA2000," IEEE, Apr. 1998.*
Chih–Lin & Gitlin, "Multi–Code CDMA Wireless Personal Communications Networks," IEEE, Feb. 1995.*

* cited by examiner

*Primary Examiner*—William Cumming (57) ABSTRACT

Disclosed is an apparatus and method for increasing the efficiency of usage of an assigned rf spectrum used by a cellular or wireless communication system for a large number of high speed data transfer user requests. An MS, upon analyzing a plurality of parameters available to the MS may determine that although it needs more than a single channel to accommodate a given software data generating application, it may adequately and optimally use less than the maximum number of channels (or maximum data rate) that the MS can support. The MS then generates a request to the base station for additional channels (or a supplemental channel of a higher data rate) to transmit in one data burst a specified total number of quantity of data. The request may also specify the maximum number of channels (or maximum data rate) that the MS can support along with an indication of relative priority by means of indicating the amount of time over which the burst occur as an optimum situation for the MS. The response from the base station may downwardly adjust the number of channels (or data rate) from that considered optimal in the request by a mobile station for a high speed data burst when available system resources are inadequate to accommodate all requests.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–10 is confirmed.

New claim 11 is added and determined to be patentable.

*11. The mobile station according to claim 10, wherein the one combination is C.*

\* \* \* \* \*